Patented Oct. 29, 1935

2,019,142

UNITED STATES PATENT OFFICE 2,019,142

DENTIFRICE

Rudolph A. Kuever, Iowa City, Iowa, assignor to The Pepsodent Co., Chicago, Ill., a corporation of Illinois No Drawing. Application February 6, 1935, Serial No. 5,267

1 Claim. (Cl. 167—93)

The present invention relates to dentifrices or the like.

Among the objects of the invention is to provide a novel dentifrice which contains a substance which has a high degree of polishing and cleansing effect with no deleterious effect whatsoever on the enamel or cementum of the teeth.

Specifically the substance referred to is insoluble sodium metaphosphate which, in accordance with the present invention, has no deleterious effect whatsoever on the enamel or cementum of the teeth, and which polishes to restore and maintain the natural color and lustre of the teeth by removing the deposits that form thereon without wearing away the surface thereof. It has the chemical formula $Na_4P_4O_{12}$; is colorless, tasteless, transparent and insoluble in water. When reduced to fine particles it serves ideally as a dentifrice alone or with any of the desired ingredients of a dentifrice. It is compatible with other ingredients desirable in a dentifrice, such as massing agents, diluents, flavoring, etc. The particles are of such a nature as to make scratching or abrading of the enamel and cementum of the teeth impossible.

Having thus disclosed the invention, I claim:

A dentifrice composition containing insoluble sodium metaphosphate reduced to fine particles so as to act as a polishing and cleansing agent.

RUDOLPH A. KUEVER.